(12) United States Patent
Hagiwara

(10) Patent No.: US 7,343,402 B2
(45) Date of Patent: Mar. 11, 2008

(54) MFP APPARATUS AND SERVER CONTROLLING THE SAME

(75) Inventor: Takahiro Hagiwara, Chiba (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 881 days.

(21) Appl. No.: 10/383,663

(22) Filed: Mar. 10, 2003

(65) Prior Publication Data

US 2004/0205099 A1    Oct. 14, 2004

(51) Int. Cl.
*G06F 15/177* (2006.01)

(52) U.S. Cl. ............................. 709/220; 358/1.15

(58) Field of Classification Search ........ 709/217–219; 715/744–755, 700; 358/1.15
See application file for complete search history.

(56) References Cited

U.S. PATENT DOCUMENTS

| | | | |
|---|---|---|---|
| 6,208,426 B1* | 3/2001 | Saito et al. ............. | 358/1.15 |
| 6,832,221 B2* | 12/2004 | Takahashi ............... | 707/6 |
| 6,934,915 B2* | 8/2005 | Rudd et al. ............. | 715/765 |
| 2001/0035972 A1* | 11/2001 | Wurmfeld ................ | 358/1.13 |
| 2002/0112184 A1* | 8/2002 | Hall et al. .............. | 713/201 |
| 2003/0011633 A1* | 1/2003 | Conley et al. .......... | 345/762 |
| 2003/0021416 A1* | 1/2003 | Brown et al. ........... | 380/277 |

FOREIGN PATENT DOCUMENTS

JP    10-143420 A    5/1998

* cited by examiner

*Primary Examiner*—Andrew Caldwell
*Assistant Examiner*—Grant M. Ford
(74) *Attorney, Agent, or Firm*—Foley & Lardner LLP

(57) ABSTRACT

In an MFP apparatus according to the present invention, a communication I/F 34 communicates with at least another MFP apparatus or a server via a network. A storage section 37 stores the data received via the communication I/F 34. Then, a CPU 21 performs control in such a manner that it organizes information about customized data in the form of a data file, applies to the server via the communication section for the registration of the data file, and transmits the customize data to another MFP apparatus via the communication section on the basis of the request of the server, or that it requests another MFP apparatus to acquire customized data and stores the customized data transmitted on the basis of the request into the storage section.

19 Claims, 16 Drawing Sheets

| Customize file name | Registration date | Authorization level | Common start flag | DL counter |
|---|---|---|---|---|
|  |  |  |  |  |

FIG. 16

| User ID | Date of the user's birth | Sex | Occupation | Hobby | Contact address and how to contact |
|---|---|---|---|---|---|
|  |  |  |  |  |  |

FIG. 17

| User name | File name | Rough classification | Middle classification | Minute classification | Keyword | Distribution condition |
|---|---|---|---|---|---|---|
|  |  |  |  |  |  |  |

FIG. 18

MFP APPARATUS AND SERVER CONTROLLING THE SAME

BACKGROUND OF THE INVENTION

A so-called multifunction printing apparatus (hereinafter, referred to as an MFP apparatus) has been widely used. The MFP apparatus stores image data taken in from an input device, such as a scanner, image data transmitted to an output device, such as a printer, and document data and manages those data. Furthermore, the MFP apparatus causes a personal computer or the like to refer to, copy, or delete the data via a network. This is called a simple filing system function. In addition, to print a once-printed document again, the MFP apparatus prints the document, reusing the stored image data.

However, what uses the image data, document data, and the like stored in the aforementioned MFP apparatus are the MFP apparatus itself reusing the image data and the like or limited client PCs or the like in the office. That is, its application is limited to a narrow range. Furthermore, at present, customize data or the like cannot be used in another MFP apparatus. Thus, even if useful valuable data is created, it is presently only used in a group, such as a company.

On the other hand, these days, the number of hot spots, such as convenience stores, is increasing and a great variety of contents, including waiting screens for mobile phones and Print Club photo-sticker images, is available. In such a situation, there have been potential demands for the equivalent exchange of the contents, the distribution of the contents for advertisement, the opening of a store dealing in the contents, and others. However, there have been no techniques coping with such demands.

BRIEF SUMMARY OF THE INVENTION

It is accordingly an object of the present invention to provide an MFP apparatus which enables such distribution as the distribution of or the exchange of customize data or the like, and a server for managing the MFP apparatus.

An MFP apparatus according to a first embodiment of the present invention comprises: a communication section to communicate with at least another MFP apparatus and a server via a network; a storage section to store the data received via the communication section; and a control section which performs control in such a manner that it organizes information about customized data in the form of a data file, applies to the server via the communication section for the registration of the data file, and transmits the customize data to another MFP apparatus via the communication section on the basis of the request of the server, or that it requests another MFP apparatus to acquire customized data and stores the customized data transmitted on the basis of the request into the storage section.

A server for managing an MFP apparatus according to a second embodiment of the present invention comprises: a communication section to communicate with the MFP apparatus via a network; a storage section to store various types of data; and a control section which performs control in such a manner that it classifies the data customized at the MFP apparatus, accepts the application for the registration of identification information, retrieves the data fulfilling the conditions for exchange related to the conditions or distribution, informs the MFP apparatus of a list of the retrieved data, and starts data transfer using the approval of the user of the MFP apparatus as an event.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16 shows an example of a customize data management table;

FIG. 17 shows an example of a user management table; and

FIG. 18 shows an example of a common data management table.

DETAILED DESCRIPTION OF THE INVENTION

Hereinafter, referring to the accompanying drawings, embodiments of the present invention will be explained.

Figure 1A:
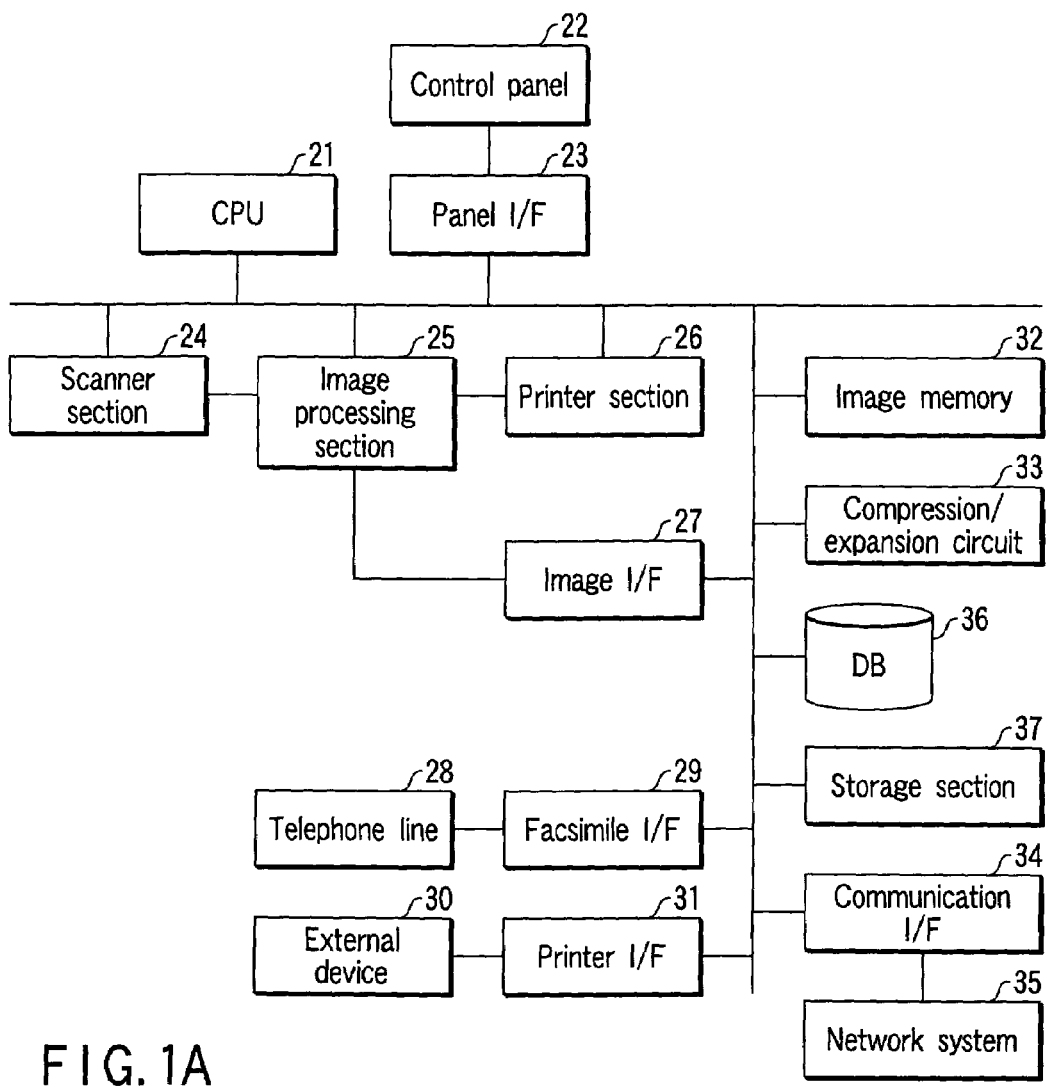
FIG. 1A shows the configuration of an MFP apparatus common to a first and a second embodiment and FIG. 1B shows the configuration of a server common to the first and second embodiments.

FIG. 1A shows the configuration of the control system of an MFP apparatus common to a first and second embodiment explained in detail later.

In the control system of the MFP apparatus 1 shown in FIG. 1A, when a copy function is carried out, a control panel 22 is used to cause a CPU 21 acting as a control section to read a document at a scanner section 24 via a panel I/F 23. Then, a printer section 26 performs a print operation via an image processing section 25.

The right to use the printer section 26 is switched between the copy function, facsimile function, and printer function in pages.

The document data received by facsimile from a telephone line 28, i.e. the facsimile-received document data, is sent to a compression/expansion circuit 33 via a facsimile I/F 29. Then, the code-converted received data is stored in an image memory 32 acting as a page memory. When a facsimile received document is printed, after a job management program in the CPU 21 acting as the control section verifies that the printer section 26 is not used, the image memory 32 uses the image processing section 25 and the printer section 26 via an image I/F 27. A printer job received via a printer I/F 31 from an external device 30, such as print data from an external device, such as a PC, is stored in the image memory 32 via the printer I/F 31.

Furthermore, the MFP apparatus 1 can communicate freely with another MFP apparatus or a server in a support center via a network system 35. The customize data and the like received via the communication I/F 34 and network system 35 is stored in, for example, a storage section 37. The registration of the customize data and the like is applied for to the server in the support center via the communication I/F 34 and network system 35. Various notices are also given via the communication I/F 34 and network system 35. These will be explained in detail later. A user management table and a common data management table are stored in a database 36, described later.

Figure 1B:
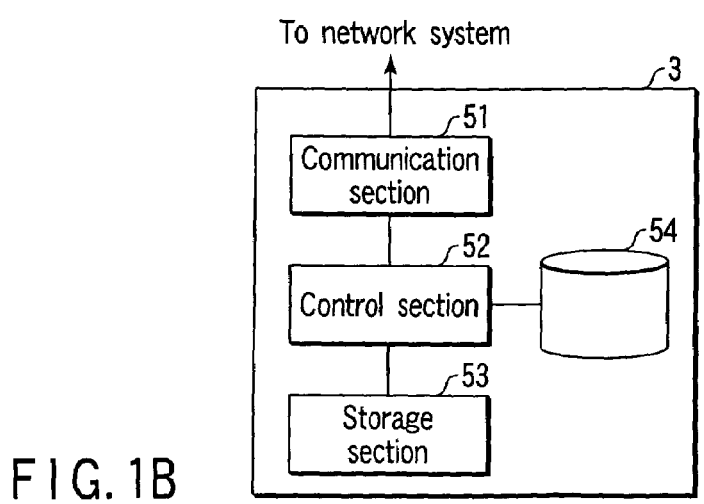

Next, FIG. 1B shows the configuration of a server common to the first and second embodiments, which will be explained in detail. As shown in FIG. 1B, the server has a control section 52 that supervises the control of the entire server.

The control section 52 includes a communication section 51 for communicating via the network system, a storage section 53 for storing various types of information, and a database 54 in which a customize data management table explained in detail later and the like are stored. In the database 54, a user management table and a common data management table may be stored.

Next, the first embodiment of the present invention will be explained.

As the first embodiment of the present invention, an MFP apparatus for distributing or exchanging the data obtained by customizing the control panel of the MFP apparatus and a server for managing the MFP apparatus will be explained in detail.

Figure 2A:
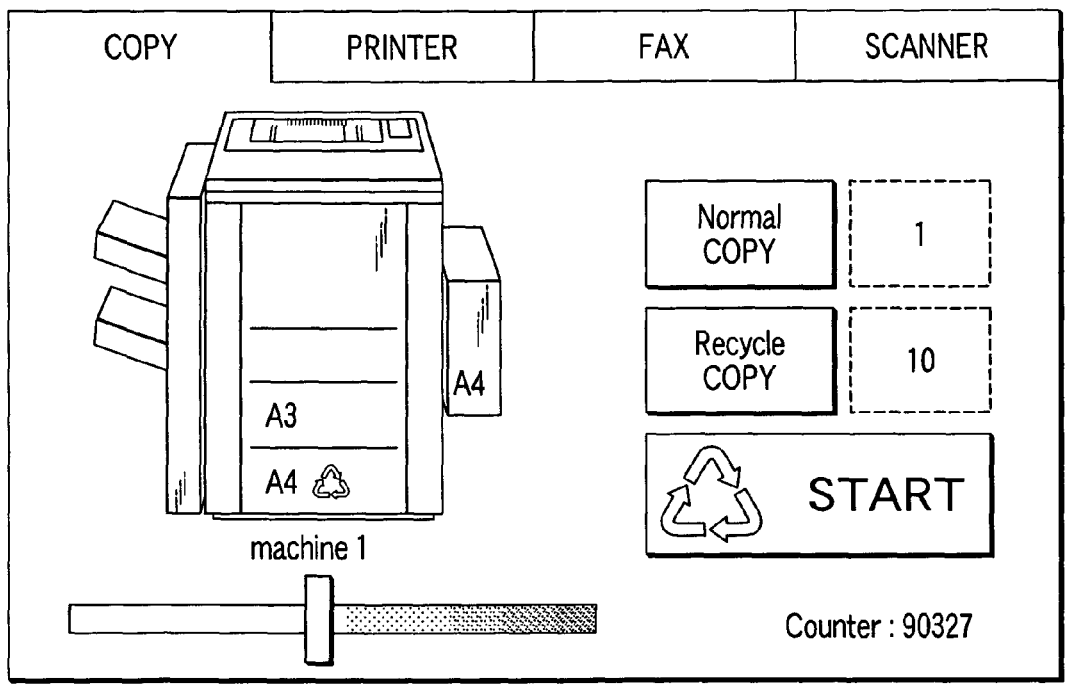
FIGS. 2A and 2B show examples of control panels created by the user.
Figure 2B:
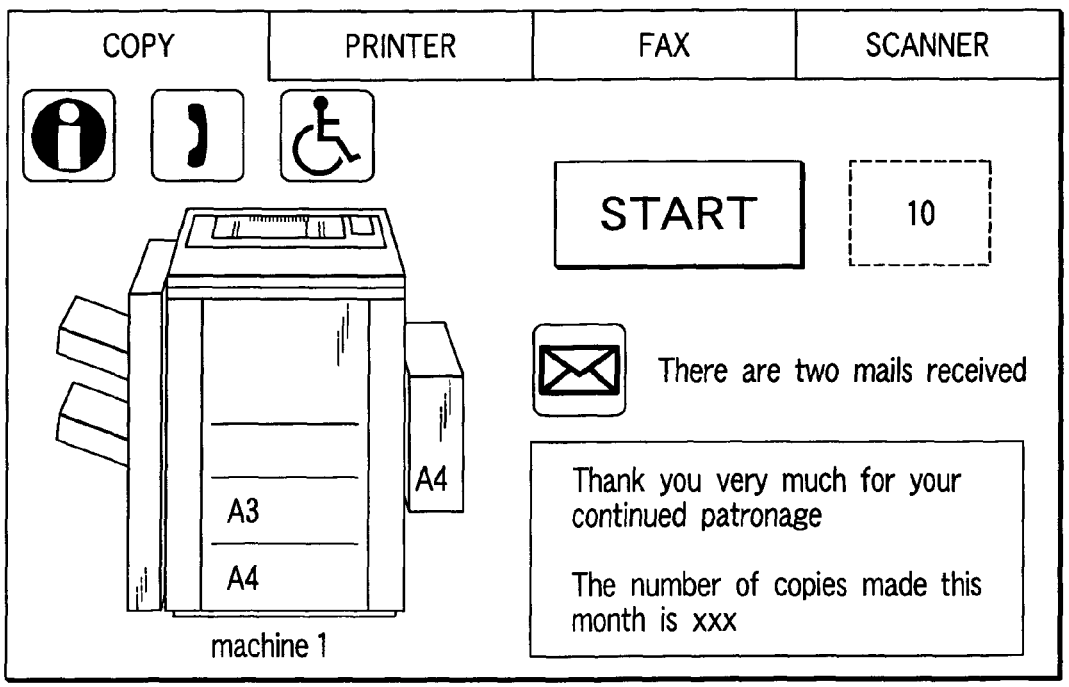

FIGS. 2A and 2B show examples of customized control panels. These control panels are formed suitably for easy use with the MFP apparatus by combining the customize parts provided by the maker or the like.

In the example of the customized control panel shown in FIG. 2A, of the copy, printer, FAX, and scanner operation screens, the copy operation screen has been selected. On the copy operation screen, a normal copy select key, a recycle copy select key, a copy start key, and others are shown.

On the other hand, in the example of the customized control panel shown in FIG. 2B, of the copy, printer, FAX, and scanner operation screens, the copy operation screen has been selected. On the copy operation screen, an indication representing mail reception, a message for the user, and others are shown.

The customize data related to the customized control panel is stored in the storage section of each MFP apparatus.

Of such customize data, that which is highly versatile, may also be valuable for another user. Even if the versatility of the customize data is insufficient, there is a strong possibility that a partial modification to the customize data will make the data usable.

Taking these into consideration, the maker or the like acquires the customize data widely and discloses the data in the first embodiment of the present invention. By doing this, there is provided an environment where customize data the user wants can be acquired easily and used. Such an approach improves the usability of the apparatus.

Alternatively, the maker checks operations. Then, the customize data passed as a standard, independently determined by the maker, is distributed as maker-authorized data. In this case, the maker's development costs can be suppressed. Furthermore, combining the data with customer information makes it possible to ship the data in which the customize data has been incorporated. In addition, sales meeting individual needs can be made.

Figure 3:
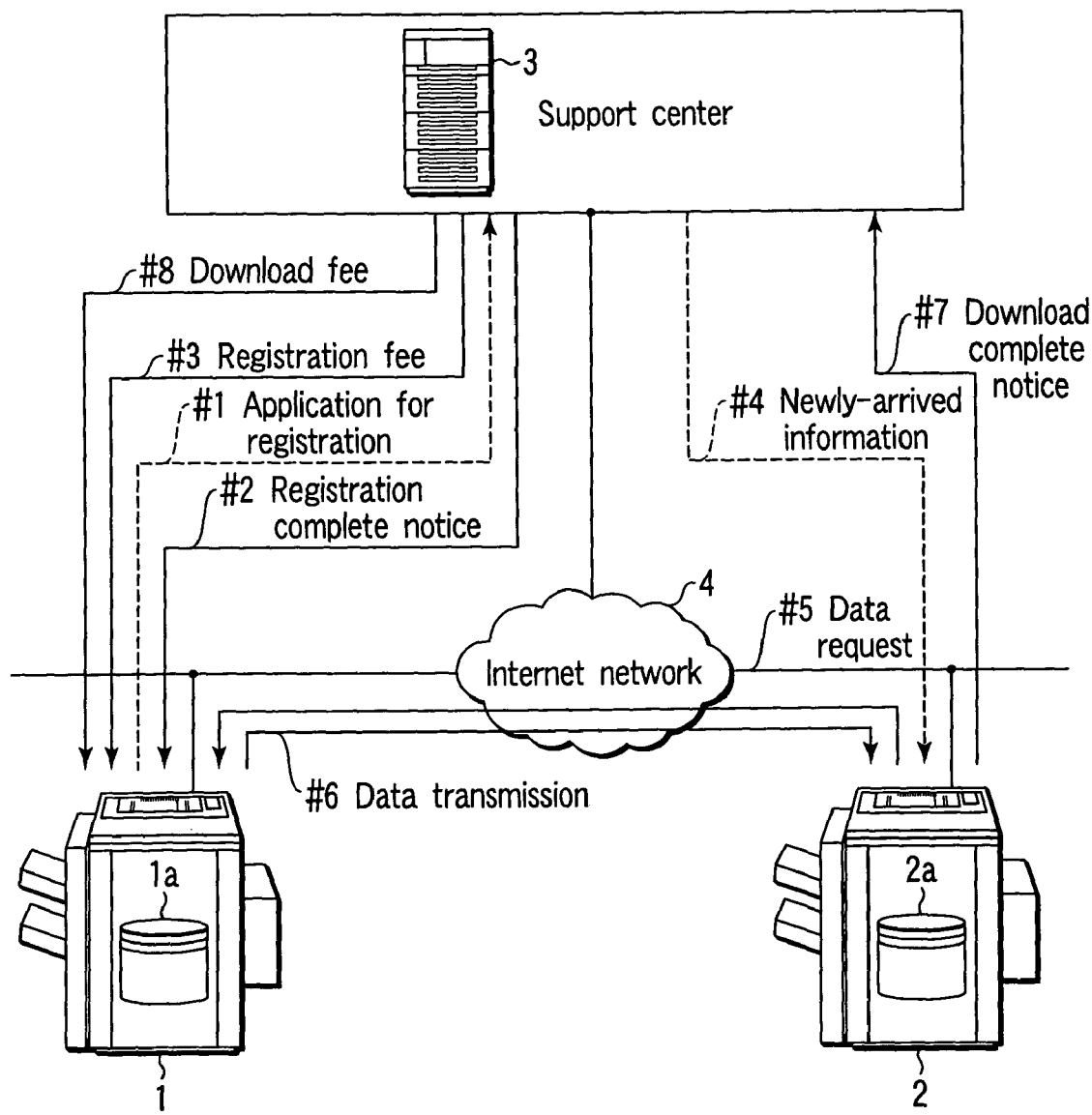
FIG. 3 is a conceptual diagram of MFP apparatuses according to the first embodiment of the present invention and a server for managing the MFP apparatuses.

FIG. 3 is a conceptual diagram of MFP apparatuses and a server for managing the MFP apparatus in the first embodiment of the present invention, which will be explained in detail.

As shown in FIG. 3, an MFP apparatus 1 and an MFP apparatus 2 are connected to a server 3 in a support center via a network system 4, such as the Internet, in such a manner that they can communicate with each other freely.

A detailed configuration of the remaining part is as shown in FIG. 1.

Although the case where the two MFP apparatuses 1, 2 are connected has been shown for the sake of explanation, the number of MFP apparatuses, of course, is not limited.

With such a configuration, the MFP apparatus 1 applies to the maker's support center for the registration of the customize data that the user thinks useful (#1).

Then, the server 3 in the maker's support center acquires the customize data via the network system 4 and checks the operation to see if there is anything wrong with the data. As a result, the server 3 asks the producer whether the data satisfying a specific standard (authorized level) should be registered in a maker support page. Then, only when the producer approves the registration, the server 3 registers the data in the maker support page or the like. After the registration, the server 3 transmits a registration complete notice to the MFP apparatus 1 side for conformation (#2).

At this time, the payment of a specific registration fee may be demanded (#3).

The information related to the customize data thus registered (or the information specifying the customize data) is delivered as newly-arrived information to the MFP apparatus 2 and the like (#4).

When another user refers to the newly-arrived information and wants to use the necessary customize data, the user requests the data from the MFP apparatus 1 in which the customize data has been stored (#5). Receiving the data request, the MFP apparatus 1 transmits the customize data related to the request via the network system 4 (#6).

When receiving the customize data, the MFP apparatus 2 transmits a download complete notice to the server 3 in the support center (#7). The support center may request the producer to pay the charges on the basis of the result of download (#8).

In the first embodiment of the present invention, it is assumed that the number of times the customize data is downloaded to the MFP apparatus 1 or 2 is limited to one. If the data has been lost due to a failure or the like, it is assumed that the serviceman copes with the problem and resets the data so that the data can be downloaded again. This is illustrative and not restrictive.

By realizing the MFP apparatuses 1, 2 configured as described above and the server 3 that manages the MFP apparatuses 1, 2, it is possible to distribute customize data, such as freeware or shareware, on the market with a high degree of freedom and add a value to the MFP apparatuses 1, 2, thereby improving the MFP apparatuses.

Figure 4:
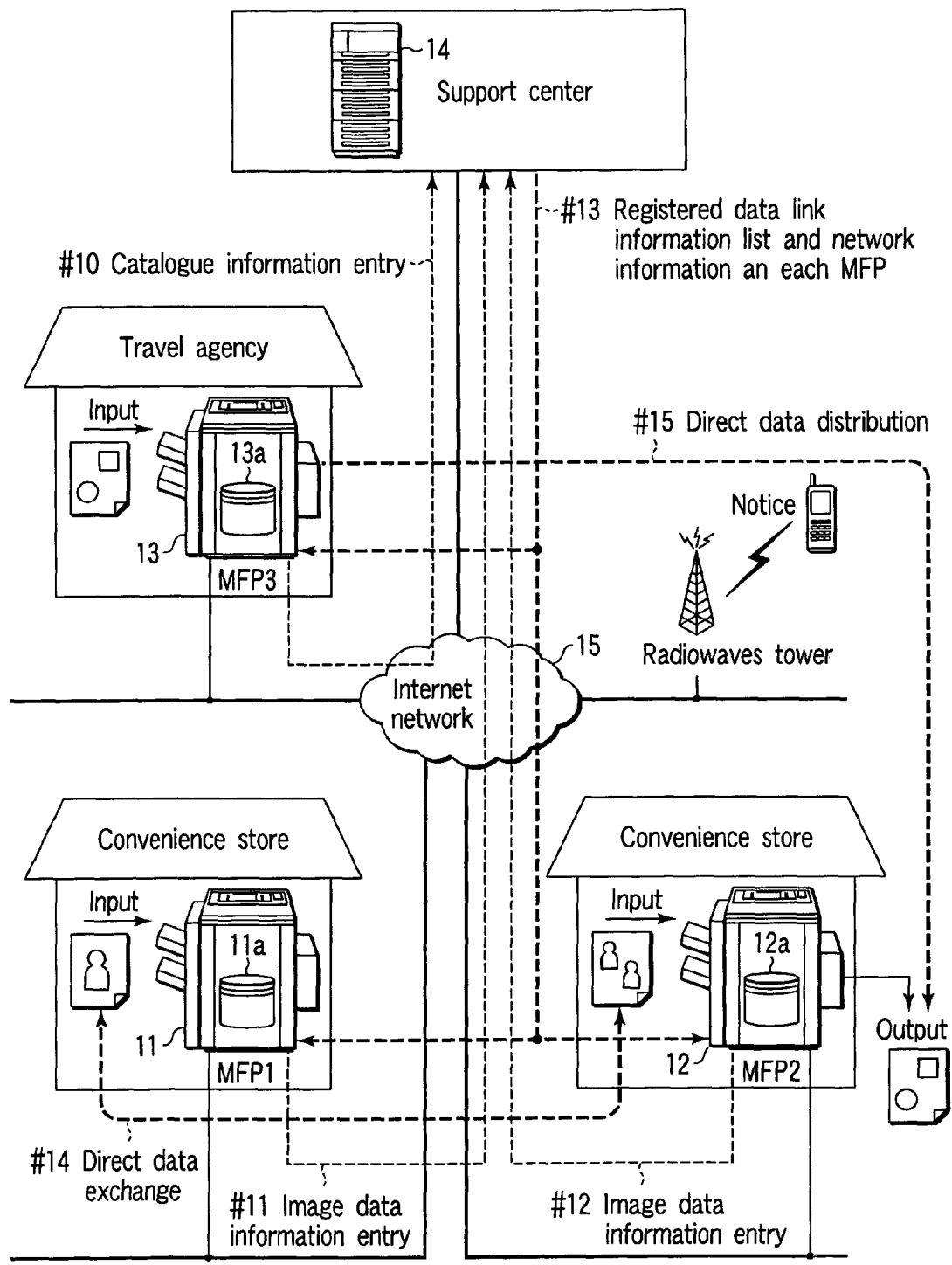
FIG. 4 shows a more concrete example of MFP apparatuses and a server for managing the MFP apparatuses in the second embodiment of the present invention.

FIG. 4 shows a more concrete example of MFP apparatuses and a server for managing the MFP apparatuses in the second embodiment of the present invention.

In the example of FIG. 4, MFP apparatuses 11 to 13 are provided in convenience stores and a travel agency. The MFP apparatuses 11 to 13 are connected to one another and also connected to a server 14 in a support center via a network system 15, such as the Internet, in such a manner that they can communicate with one another freely. The MFP apparatuses 11 to 13 have databases 11a, 12a, 13a, respectively.

A detailed configuration of the remaining part of the MFP apparatuses is as shown in FIG. 1.

With such a configuration, using an input device (not shown), image data and the like are registered in personal folders in the databases 11a, 12a of the MFP apparatuses 11, 12 installed in the convenience stores. In a personal folder in the database 13a of the MFP apparatus 13 installed in the travel agency, catalogue data and the like are registered using an input device (not shown). Such information as the catalogue data and image data (specific information or the like) is entered from the MFP apparatuses 11 to 13 into the server 14 of the support center (#10 to #12).

Only the users permitted by the installers of the MFP apparatuses 11 to 13 can use the personal folders. At the convenience stores or the like, the user is identified by using an ID card or the like and can use the personal folder as needed. The use of the personal folder generally has to be paid for. However, when the condition determined by the installers, such as the result of using the MFP apparatuses 11 to 13 or the number of orders of advertisements received, is satisfied, the personal folder may be used free of charge.

After the information is entered, the server 14 of the support center delivers the registered various data items, various link information lists, and network information about each of the MFP apparatuses to the MFP apparatuses 11 to 13 via the Internet network 15 (#13).

The link information lists are composed of lists or the like including the addresses of the MFP apparatuses holding the customize data and others and the information for specifying the customize data the registration of which is applied for by the MFP apparatuses 11 to 13.

The MFP apparatuses 11 to 13 can exchange data directly (#14) and distribute the data directly (#15) via the network system 15.

Here, the user of each of the MFP apparatuses 11 to 13 registers a genre with a hierarchic structure using keywords "rough classification," "middle classification," and "minute classification," or the like in the data stored in the user's personal folder. Then, at least one "free word" or a condition, such as free distribution or equivalent exchange, may be added. These pieces of information are stored in a common data management table as shown in, for example, FIG. 18.

Then, these pieces of information are also sent to the server 14 of the support center at the time of the entry of the information and are registered together with the machine address, user information, and others.

Next, when the image data or print data the user wants is present, the user requests the classification and keywords from the server 14 of the support center. At this time, when the user wants to download the data for equivalent exchange, the user has to add the prospective data to be exchanged. Receiving the request, the server 14 of the support center carries out a matching process periodically for classification, keywords, and conditions. During the matching process, the common data management table is referred to.

When the exchange condition is satisfied in the matching process, this is notified to the place specified by the user who has made the request. Receiving the notice, the user makes reference using a special tool installed in the MFP apparatuses 11 to 13 or the like to check to see if the image is what the user wanted. If it is the desired data, the user selects one from the prospective exchange data items and gives a transfer request notice to the server 14 of the support center. Receiving the notice, the server 14 of the support center transmits data storage location information and an encryption key to any one of the MFP apparatuses 11 to 13. Any one of the MFP apparatuses 11 to 13 establishes a data link with any one of the MFP apparatuses 11 to 13 in which the data is to be stored and starts data exchange.

At this time, the sent data is encrypted using the encryption key. The encrypted data is stored in both personal folders. When data with no error is received, at least one of the MFP apparatuses 11 to 13 sends a reception complete notice to the server 14 of the support center. When receiving a reception acknowledge notice from both sides, the server 14 of the support center determines that an exchange is opened and sends a decryption key to the MFP apparatuses 11 to 13 on both sides. At least one of the MFP apparatuses 11 to 13 carries out a data decrypting process using the received decryption key, thereby completing the data exchange.

In a case where the data is delivered free of charge, as at, for example, a travel agency, the processing is done as described above. Specifically, when the user gives a transfer request notice to the server 14, the data is delivered immediately without checking the intentions of the distributor. When the data is printable, the sender may pay printing charges in place of the user.

Hereinafter, referring to FIGS. 5 to 18, various processes in the MFP apparatuses related to the second embodiment of the present invention will be explained in further detail. The processes below are carried out by any one of the MFP apparatuses 11 to 13 in connection with the example of FIG. 4.

For the sake of explanation, explanation will be given without specifying the reference numbers of the MFP apparatuses.

Figure 5:
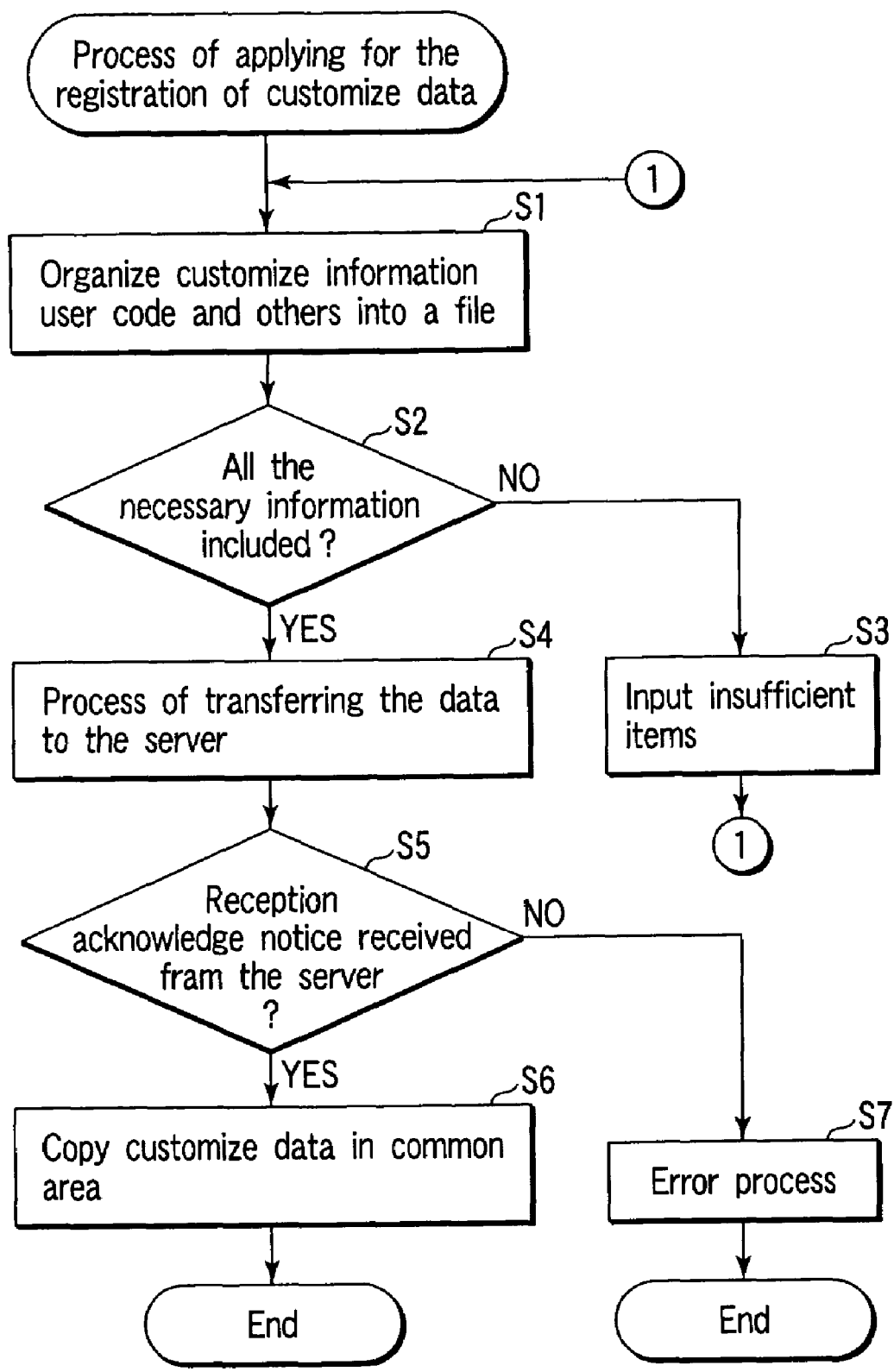
FIG. 5 is a flowchart for the process of applying for the registration of customize data in the MFP apparatus according to the second embodiment of the present invention.

First, the process of applying for the registration of the customize data in the MFP apparatus according to the second embodiment will be explained in detail by reference to a flowchart in FIG. 5.

When starting to carry out the process of applying for the registration, the MFP apparatus organizes the customize information, user code, and others into a file (step S1). Then, the MFP apparatus determines whether all of the necessary information is included in the file (step S2). If all of the necessary information is not included, insufficient items are inputted and control returns to step S1 (step S3).

On the other hand, when all of the necessary information is included in the file, the MFP apparatus transmits retrieval key data in the information included in the file to the server 14 of the support center (step S4). In step S4, the MFP apparatus does not transfer the customize data larger in quantity, but extracts only the key data necessary to retrieve the customize data from the file and transmits the key data.

Next, the MFP apparatus determines whether it has received a reception acknowledge notice from the server 14 of the support center (step S5). If a notice is not received, the MFP apparatus carries out a specific error process (step S7) and completes the process.

On the other hand, in step S5, if a reception acknowledge notice is received, the MFP apparatus copies the customize data in the common area of the storage section (not shown) (step S6), and completes the process.

Figure 6:
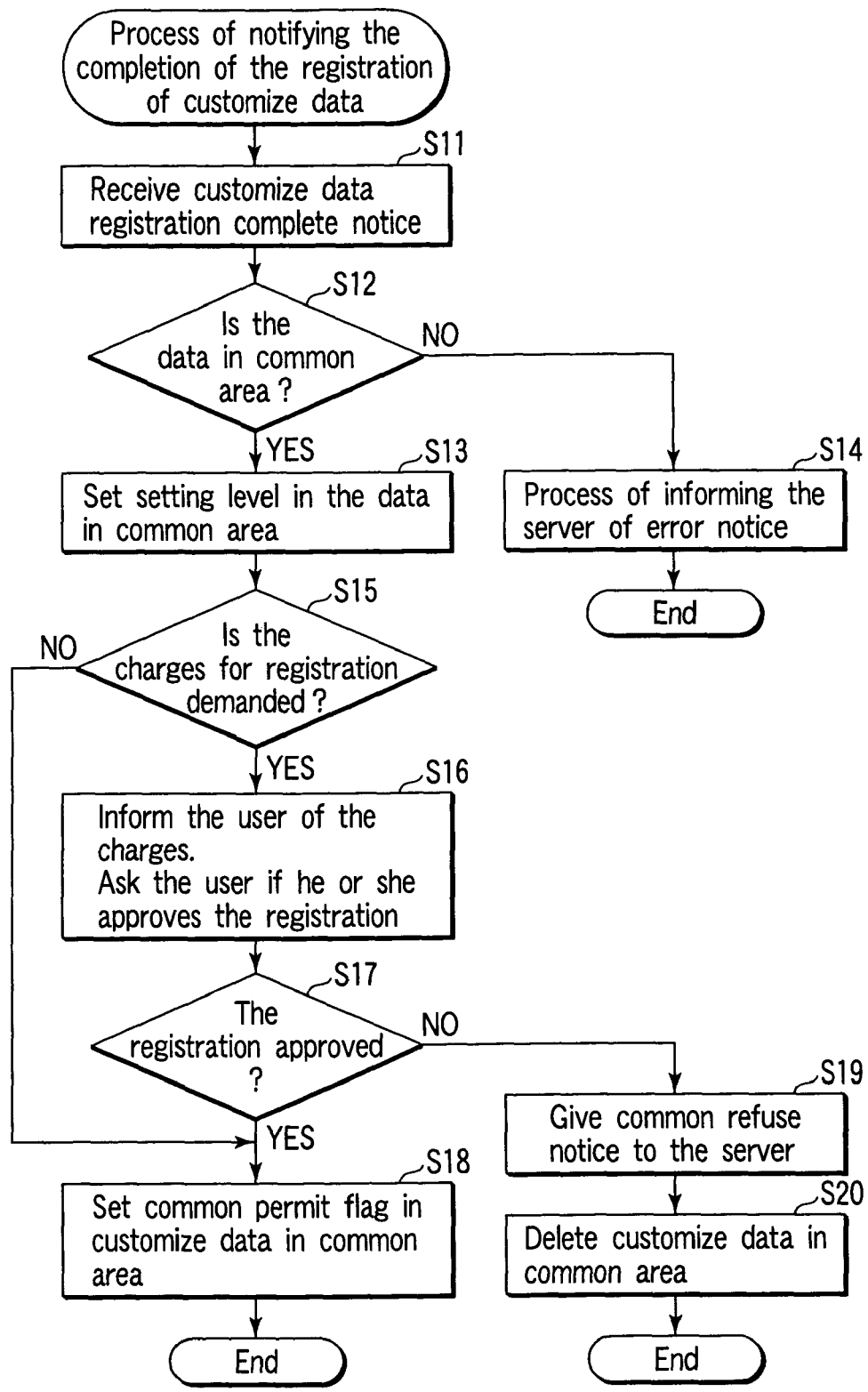
FIG. 6 is a flowchart for the process of notifying the completion of the registration of customize data in the MFP apparatus according to the second embodiment of the present invention.

Next, referring to a flowchart in FIG. 6, a customize data registration complete notifying process in the MFP apparatus of the second embodiment will be explained in detail.

When starting to carry out the registration complete notifying process, the MFP apparatus receives a customize data registration complete notice from the server 14 (step S11).

Then, the MFP apparatus determines whether the corresponding data exists in the common area in its database (step S12).

If corresponding data does not exist in the common area, the MFP apparatus gives an error notice to the server 14 of the support center (step S14). On the other hand, if the corresponding data exists in the common area, the MFP apparatus sets an authorization level in the data (step S13). The authorization level is a condition for determining to what extent data distribution, data exchange, and others are permitted under what condition in terms of security.

Next, the MFP apparatus determines at the authorization level (condition) whether a registration fee is demanded (step S15). If a registration fee is not demanded, control proceeds to step S18.

On the other hand, in step S15, if a registration fee is demanded, the MFP apparatus at the data provider informs the MFP apparatus at the data requester of the value of the fee and asks the requester whether to approve the registration fee (step S16). Then, the MFP apparatus determines whether the registration is approved (step S17).

In step S17, if the user of another MFP apparatus has approved the registration fee, control proceeds to step 18 (step S17). In step S18, the MFP apparatus sets a common permit flag in the customize data in the common area of the storage section (not shown) in the MFP apparatus, and completes the present process.

On the other hand, in step S17, when the user of another MFP apparatus does not approve the registration, the MFP apparatus transmits a common refuse notice to the server 14 of the support center (step S19) and deletes the customize data in the common area of the database in the one other MFP apparatus, which completes the present process (step S20).

Figure 7A:
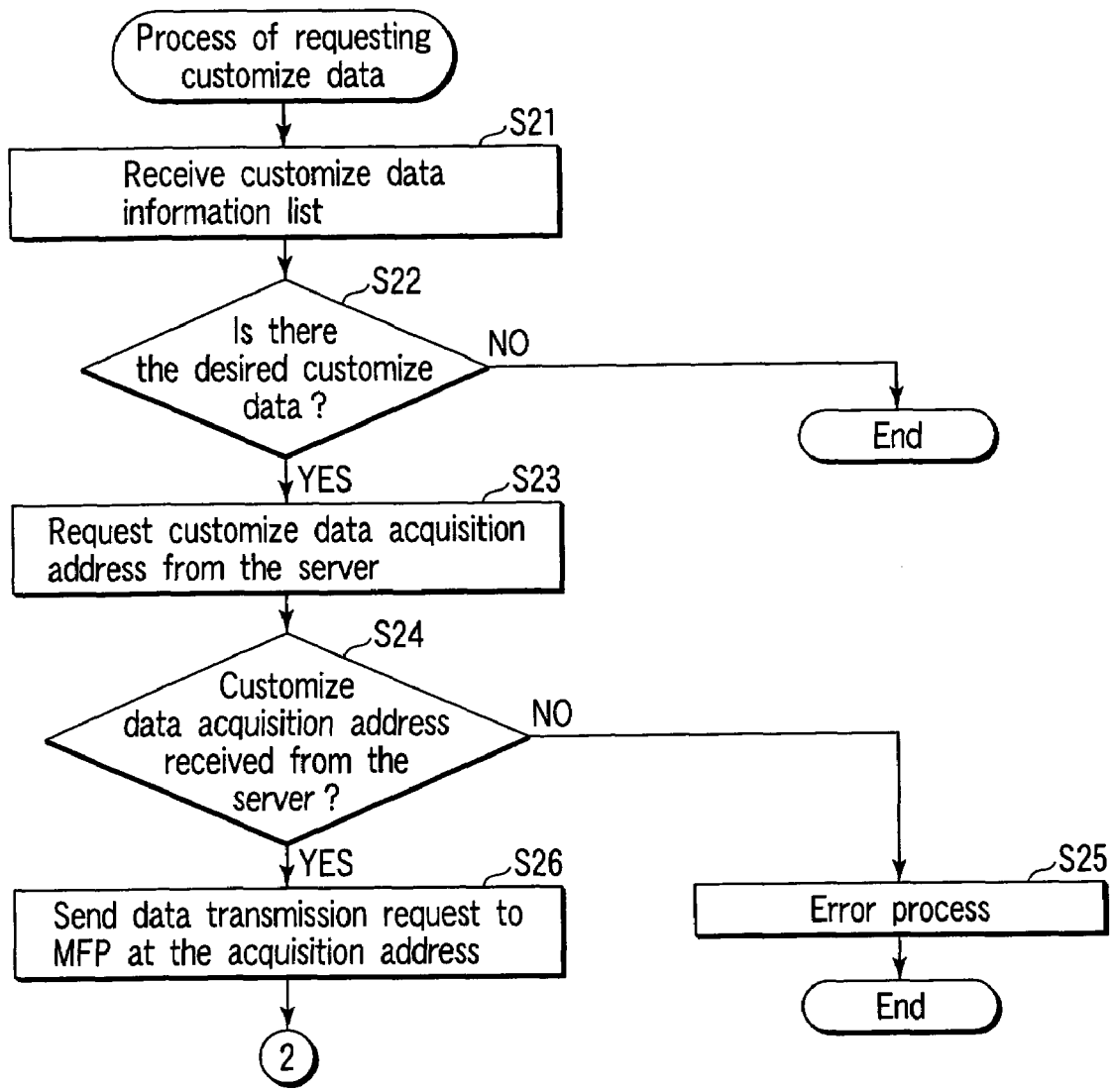
FIGS. 7A and 7B are flowcharts for the process of requesting customize data in the MFP apparatus according to the second embodiment of the present invention.
Figure 7B:
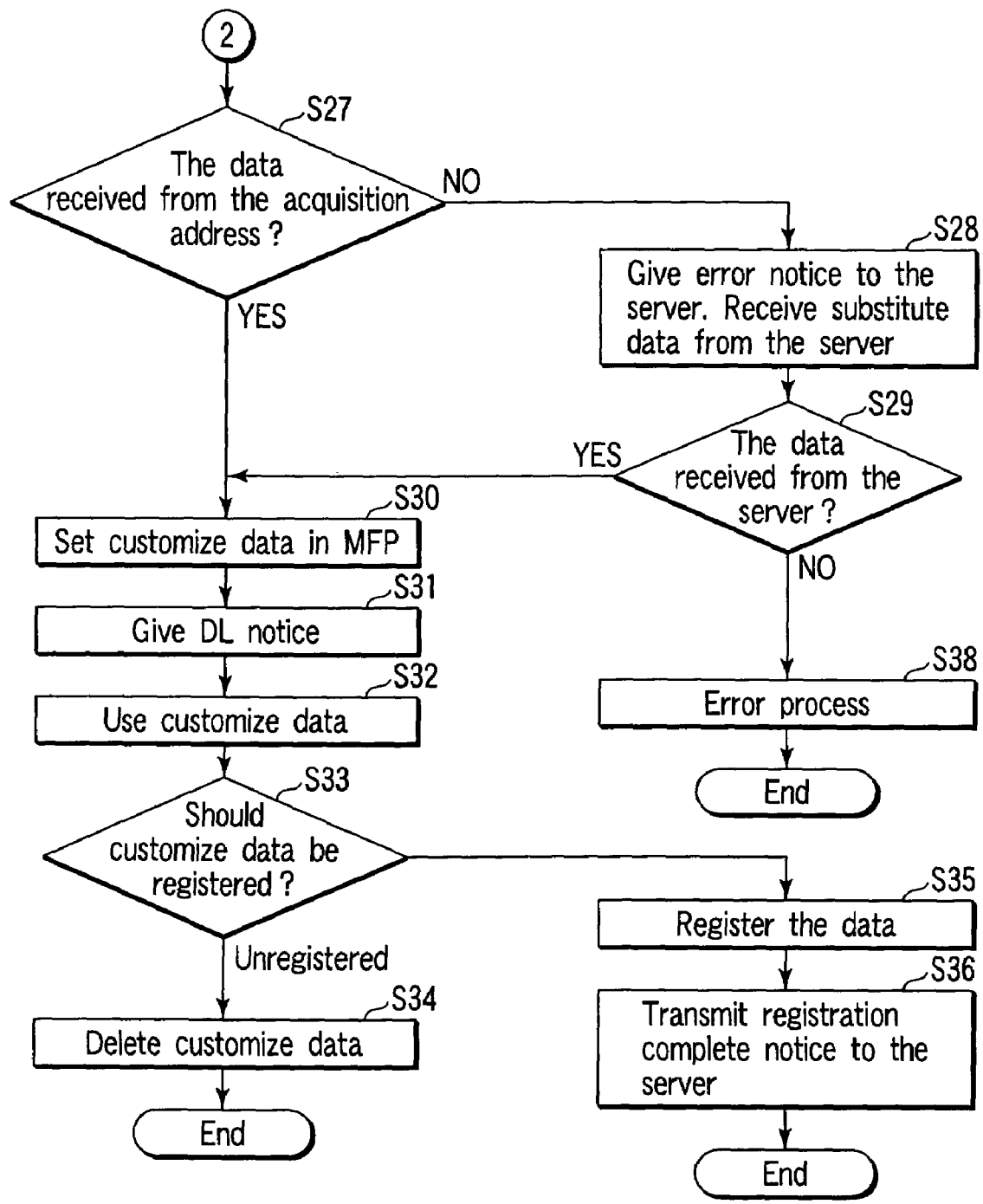

Next, referring to flowcharts in FIGS. 7A and 7B, a customize data requesting process in the MFP apparatus of the second embodiment will be explained in detail.

First, explanation will be given by reference to FIG. 7A.

When starting to carry out the requesting process, the MFP apparatus receives a customize data information list from the server 14 (step S21) and determines whether the customize data the user wants exists in the list (step S22). If the desired customize data does not exist in the list, the present process is ended.

On the other hand, in step S22, if the desired customize data exists in the list, the MFP apparatus requests the customize data acquisition address from the server 14 of the support center (step S33).

Then, the MFP apparatus determines whether the acquisition address has been received from the server 14 (step S24). In step S24, if the MFP apparatus has not received the address from the server 14, it carries out a specific error process (step S25) and ends the present process. On the other hand, in step S24, as the MFP apparatus has received the address from the server 14, it requests data transmission from the MFP apparatus at the data provider on the basis of the address (step S26).

Hereinafter, explanation will be given by reference to FIG. 7B.

Next, the MFP apparatus determines whether the data has been received from the MFP apparatus specified by the acquisition address (step S27).

Then, in step S27, when having not received the data from the acquisition address, the MFP apparatus performs an error process on the server 14 and receives substitute data from the server 14 (step S28).

Next, the MFP apparatus determines whether it has received the substitute data from the server 14 (step S29). Then, if having not received the substitute data, the MFP apparatus carries out an error process (step S38) and completes the present process.

On the other hand, if having received the data from the address in step S27 and if having received the substitute data from the server 14 in step S29, the MFP apparatus sets the customize data sent from the MFP apparatus at the data provider or the substitute data (step S30). Then, after the setting, the MFP apparatus gives a specific download notice to the server 14 (step S31).

Next, the MFP apparatus actually uses the customize data (step S32) and receives the user's registration approval/disapproval decision (step S33). In step S33, if it is determined that the customize data should be registered, the data is registered (step S35). Then, the MFP apparatus transmits a registration complete notice to the server (step S36) and completes the present process.

On the other hand, in step S33, if it is determined that the customize data should not be registered, the MFP apparatus deletes the customize data (step S34) and ends the present process. In the embodiment, after the customize data is downloaded and actually used, it is determined whether the customize data should be registered or not. However, the present invention is not limited to this.

Figure 8:
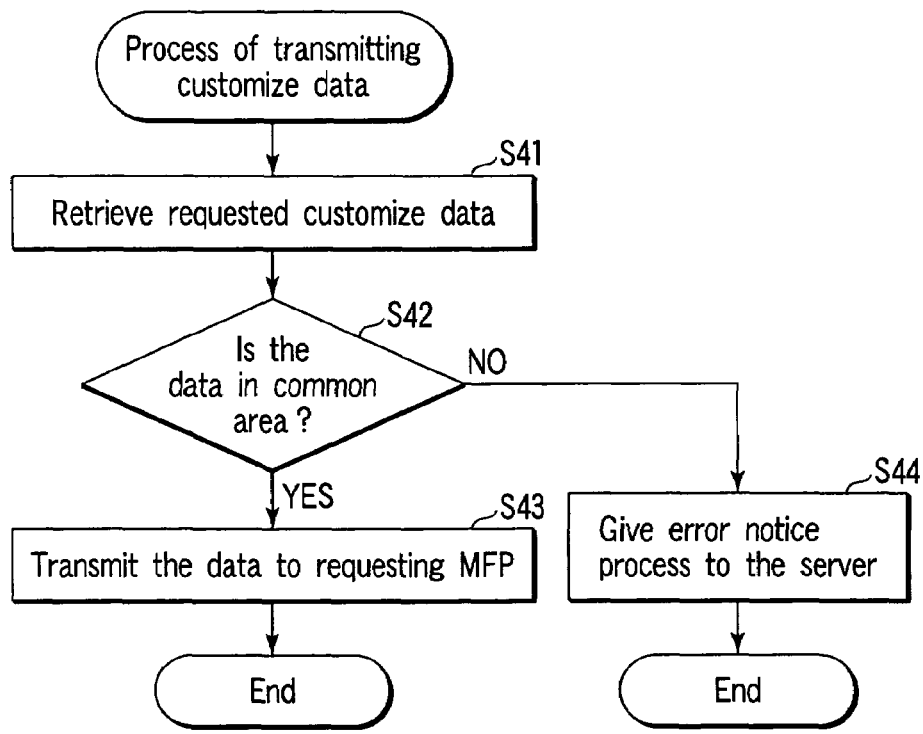
FIG. 8 is a flowchart for the process of transmitting customize data in the MFP apparatus according to the second embodiment of the present invention.

Next, referring to a flowchart in FIG. 8, a customize data transmitting process in the MFP apparatus of the second embodiment will be explained in detail.

When starting to carry out the transmitting process, the MFP apparatus retrieves the customize data requested by another MFP apparatus (step S41).

Then, the MFP apparatus determines whether the customize data exists in the common area of the storage section (not shown) (step S42).

The reason why the MFP apparatus determines whether the corresponding customize data exists in the common area is that, since the server 14 updates the list at specific intervals, there may be a case where the customize data is in the list, but the corresponding data is actually not stored in the common area.

In step S42, if the corresponding data exists in the common area, the data is transmitted to the MFP apparatus at the requester (step S43) and the present process is ended. On the other hand, if the corresponding data does not exist in the common area, an error notice is given to the server 14 (step S44) and the present process is ended.

Figure 9:
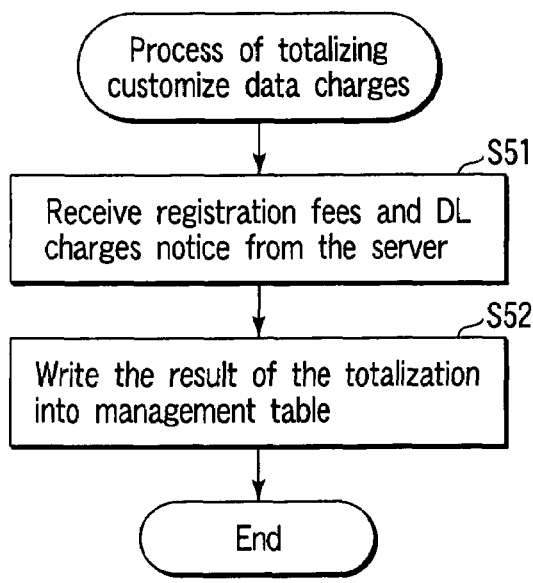
FIG. 9 is a flowchart for the process of totalizing the charges for customize data in the MFP apparatus according to the second embodiment of the present invention.

Next, referring to a flowchart in FIG. 9, a customize data charges totalizing process in the MFP apparatus of the second embodiment will be explained in detail.

When starting to carry out the charges totalizing process, the MFP apparatus receives a registration fee and download charge notice from the server 14 (step S51).

Then, the MFP apparatus writes the result of the totalization into a customize data management table as shown in FIG. 16, on the server 14 side (step S52) and completes the present process. In the customize data management table, the customized file name, registration date, authorization level, common start flag, DL counter, and others are stored in such a manner that they are correlated to one another. The stored contents are not limited to these.

Figure 10:
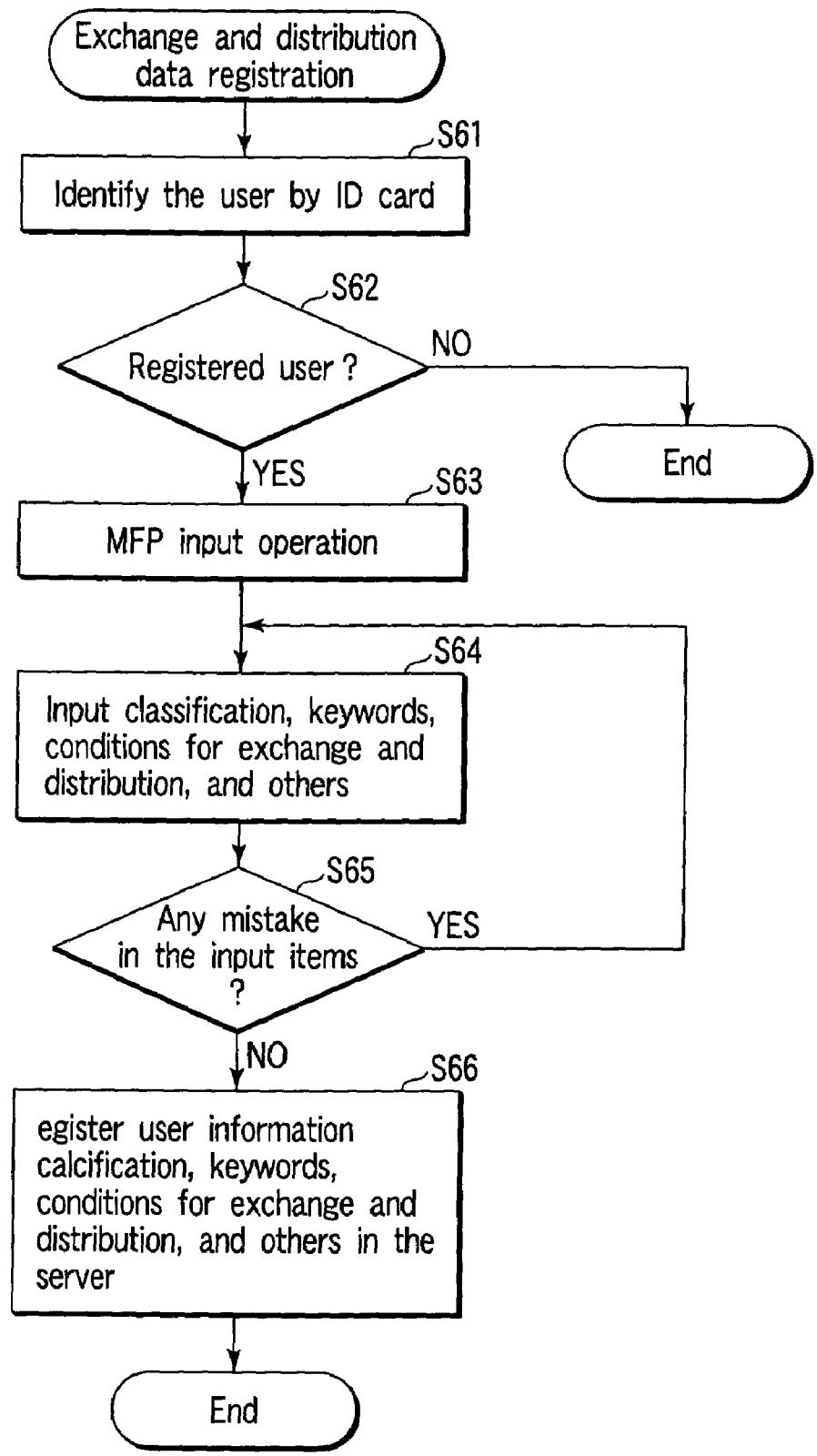
FIG. 10 is a flowchart for the process of exchanging customize data and registering distribution data in the MFP apparatus according to the second embodiment of the present invention.

Next, referring to a flowchart in FIG. 10, the process of exchanging the customized data and registering the distribution data in the MFP apparatus of the second embodiment will be explained in detail.

When starting to carry out the process of exchanging the customized data and registering the distribution data, the MFP apparatus receives the input of an ID card and identifies the user by the ID (step S61).

The MFP apparatus determines whether the user is a registered user (step S62).

In step S62, if the MFP apparatus has determined that the user is not a registered user, it ends the present process. When determining whether the user is a registered user, the MFP apparatus uses, for example, a user management table shown in FIG. 17.

When the MFP apparatus has the user management table, the MFP apparatus can determine by itself whether the user is a registered user. When the server 14 has the user management table, information about the user ID is sent to the server 14. Then, the server 14 determines whether the user is a registered user.

In the user management table shown in FIG. 17, the user ID, the date of the user's birth, sex, occupation, hobby, contact address, and how to contact are stored in such a manner that they are correlated to one another.

On the other hand, if the MFP apparatus has determined that the user is a registered user, it accepts the user's input operation (step S63) and receives the input of conditions related to classification, keywords, exchange, distribution, and others (step S64). Then, the MFP apparatus determines whether there is any mistake in the input items (step S65). If the MFP apparatus has determined that there is a mistake in the input items, it passes control to step S64 and repeats the above process.

On the other hand, in step S65, if the MFP apparatus has determined that there is no mistake in the input items, it registers the conditions related to, for example, the user information, classification, keywords, exchange, distribution, and others in the common data management table in the server 14 of the support center (step S66) and ends the present process. In the common data management table, the user ID, file name, rough classification, middle classification, minute classification, keywords, distribution conditions, and others are stored in such a manner that they are correlated to one another. However, the present invention is not limited to this.

Figure 11:
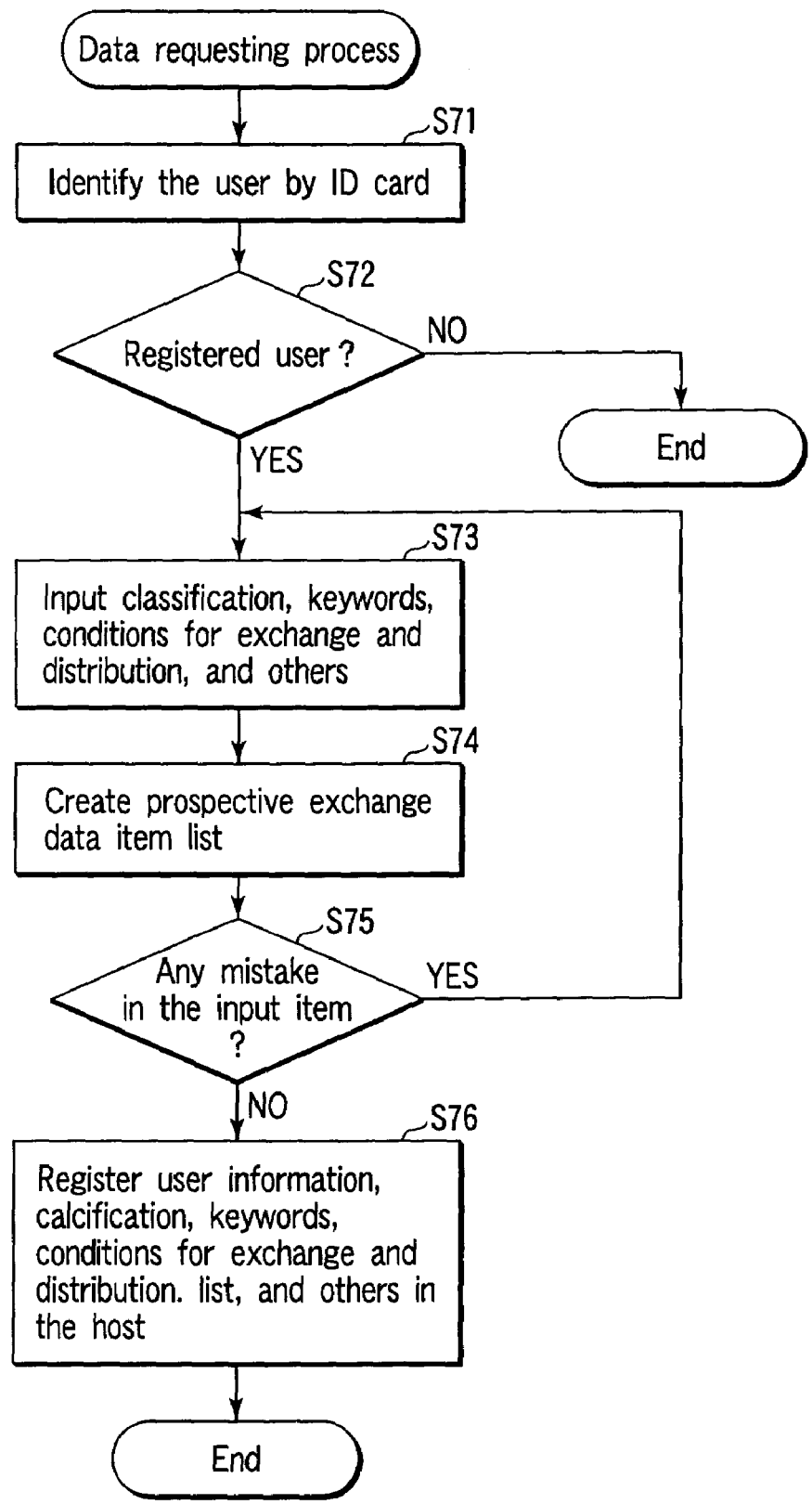
FIG. 11 is a flowchart for the process of requesting data in the MFP apparatus according to the second embodiment of the present invention.

Next, referring to a flowchart in FIG. 11, a data requesting process in the MFP apparatus of the second embodiment will be explained.

When starting to carry out the data requesting process, the MFP apparatus receives the input of the ID card and identifies the user by the ID (step S71). The MFP apparatus determines whether the user is a registered user (step S72). If the MFP apparatus has determined that the user is not a registered user, it ends the present process. When the MFP apparatus has the user management table, the MFP apparatus determines by itself whether the user is a registered user. When the server 14 has the user management table, information about the user ID is transmitted to the server 14. Then, the server 14 determines whether the user is a registered user.

On the other hand, if the MFP apparatus has determined that the user is a registered user, it receives the input of the conditions related to classification, keywords, exchange, distribution, and others (step S73).

Furthermore, the MFP apparatus creates a prospective exchange data item list (step S74).

Then, the MFP apparatus determines whether there is any mistake in the input items (step S75). If the MFP apparatus has determined that there is a mistake in the input items, it returns control to step S73 and repeats the above process. On the other hand, if the MFP apparatus has determined that there is no mistake in the input items, it registers the conditions related to, for example, the user information, classification, keywords, exchange, distribution, and others in the table (not shown) in the server 14 of the support center (step S76) and ends the present process.

Figure 12:
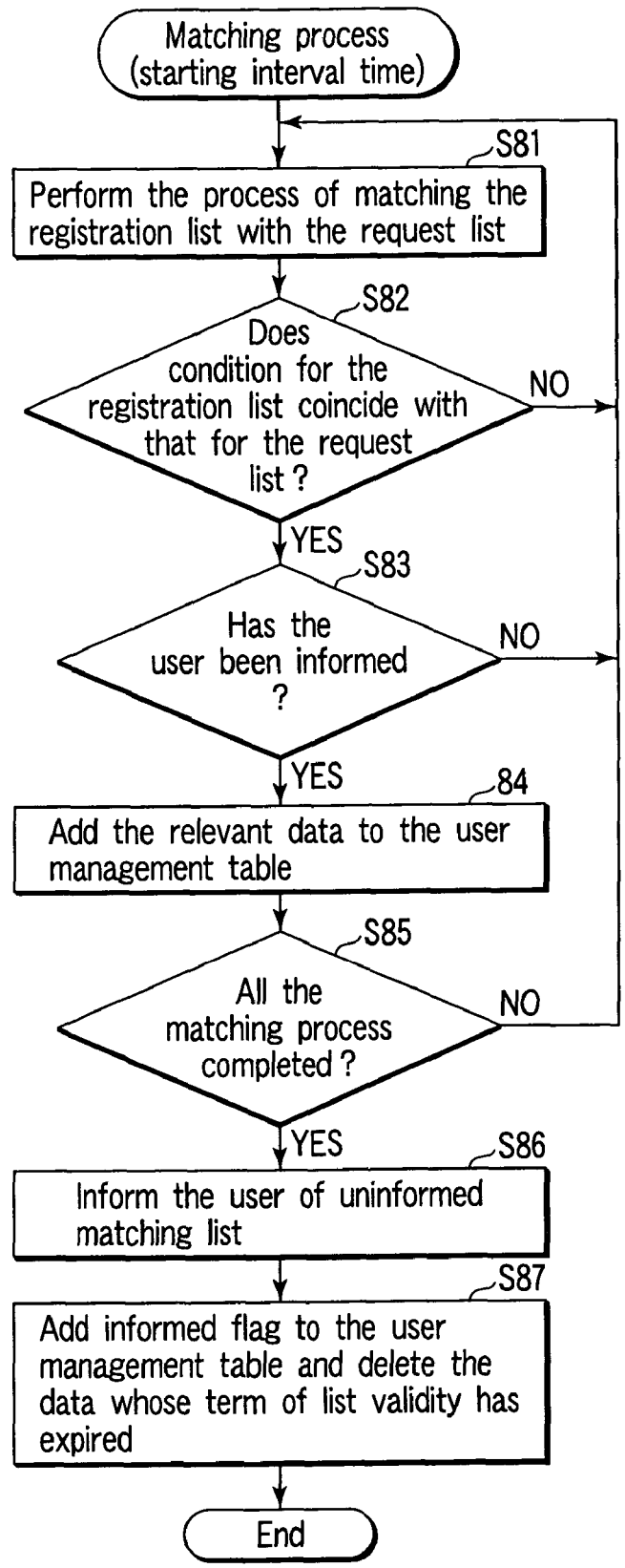
FIG. 12 is a flowchart for a matching process by the MFP apparatus according to the second embodiment of the present invention.

Next, referring to a flowchart in FIG. 12, a matching process in the MFP apparatus of the second embodiment will be explained. For example, an interval timer is started, thereby starting the matching process.

When starting to carry out the matching process, the MFP apparatus performs the process of matching the registration list with the request list (step S81) and thereby determines whether the condition for the registration list in the common data management table coincides with the condition for the request list in the table (not shown) (step S82). In step S82, if both of the conditions do not coincide with each other, the MFP apparatus returns control to step S81 and repeats the above process. On the other hand, when both of the conditions coincide with each other, the MFP apparatus determines whether the user has been informed of the fact (step S83).

If the user has been informed, the MFP apparatus returns control to step S81 and repeats the above process. On the other hand, if the user has not been informed, the MFP apparatus adds the relevant data to the user management table (step S84).

Next, the MFP apparatus determines whether all of the matching processes have been completed (step S85). In step S85, if the MFP apparatus has determined that all of the matching processes have not been completed, it returns control to step S81 and repeats the above process.

On the other hand, in step S85, the MFP apparatus has determined that all of the matching processes have been completed, it informs the user's MFP apparatus of the uninformed matching lists (step S86), adds an informed flag to the user management table, deletes the data whose term of list validity has expired (step S87), and ends the present process.

Figure 13:
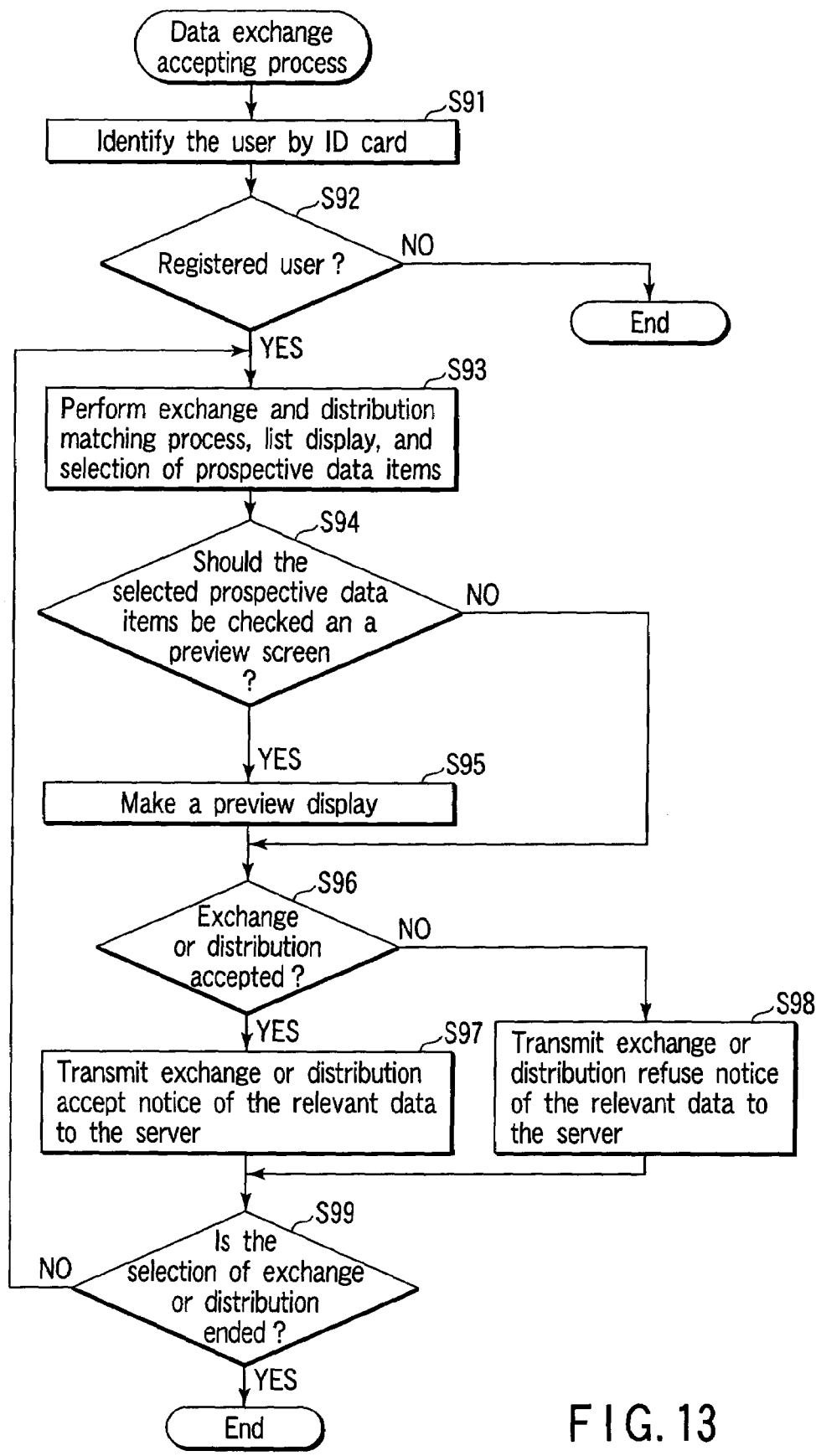
FIG. 13 is a flowchart for the process of accepting data exchange in the MFP apparatus according to the second embodiment of the present invention.

Next, referring to a flowchart in FIG. 13, a data exchange accepting process in the MFP apparatus of the second embodiment will be explained.

When starting to carry out the data exchange accepting process, the MFP apparatus accepts an ID card and identifies the user by the ID (step S91). Then, referring to the user management table, the MFP apparatus determines whether the user is a registered user (step S92). If the user is not a registered user, the MFP apparatus ends the present process.

On the other hand, in step S92, if the user is a registered user, the MFP apparatus carries out an exchange and distribution matching process and a specific process related to list display and selection of data items to be exchanged or distributed (step 93).

Then, the MFP apparatus determines whether to check the selected data items on a preview screen (step S94). If the MFP apparatus does not check the selected ones, it proceeds to step S96. If the MFP apparatus checks them, it makes a preview display (step S95) and proceeds to step S96.

Next, the MFP apparatus determines whether to accept the exchange or distribution of the customize data (step S96). If the MFP apparatus accepts the exchange or distribution, it transmits a notice to accept the exchange or distribution of the relevant data to the server 14 (step S97).

On the other hand, in step S96, if the MFP apparatus does not accept the exchange or distribution, it transmits a notice to refuse the exchange or distribution of the relevant data to the server 14 (step S98).

In this way, the MFP apparatus determines whether to end the selection of exchange or distribution (step S99). If the MFP apparatus does not end the selection or the like, it returns control to step S93 and repeats the above process. If the MFP apparatus ends the selection, it ends the present process.

Figure 14:
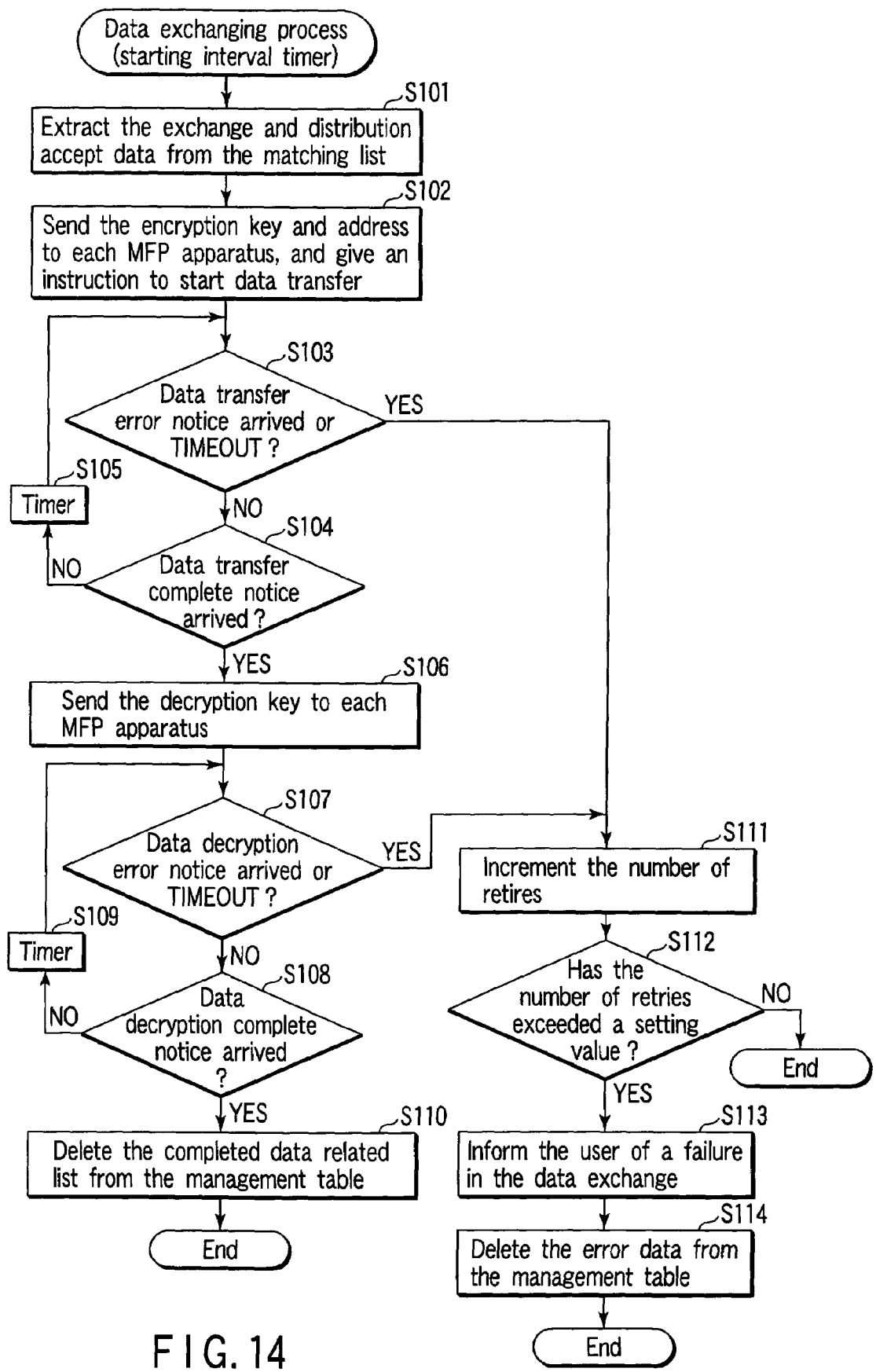
FIG. 14 is a flowchart for the process of exchanging data in the MFP apparatus according to the second embodiment of the present invention.

Next, referring to a flowchart in FIG. 14, a data exchanging process in the MFP apparatus of the second embodiment will be explained. The data exchanging process is started when the server 14 starts the interval timer.

When starting to carry out the data exchanging process, the MFP apparatus extracts the exchange and distribution accept data from the matching list (step S101), sends the encryption key and address to each MFP apparatus, and gives an instruction to start data transfer (step S102).

Next, the MFP apparatus determines whether a data transfer error notice has arrived or time-out has been sensed (step S103). If the MFP apparatus has sensed the arrival of a data transfer error notice or time-out, it proceeds to step S111.

Then, in step 103, if the MFP apparatus has sensed none of them, it determines whether a data transfer complete notice has arrived (step S104). If the MFP apparatus has not received the data transfer complete notice, it clocks the time with a timer (step S105) and returns control to step S103.

Next, the MFP apparatus transmits the decryption key to each MFP apparatus (step S106). Then, the MFP apparatus determines again whether a data decryption error notice has arrived or time-out has been sensed (step 107).

In step S107, if the MFP apparatus has sensed the arrival of a data decryption error notice or time-out, it proceeds to step S111.

On the other hand, in step S107, if the MFP apparatus has sensed none of them, it determines whether a data decryption complete notice has arrived (step S108). If the MFP apparatus has not received the data decryption complete notice, it clocks the time with the timer (step S109) and returns control to step S107.

In step S108, if the MFP apparatus has received a data decryption complete notice, it deletes the completed data related list from the management table (step S110) and ends the present process.

In step S111, the MFP apparatus increments the number of retries and determines whether the number of retries has exceeded a setting value (step S112).

In step S112, if the number of retries has exceeded the setting value, the MFP apparatus informs the user of a failure in the data exchange (step S113), deletes the error data from the management table (step S114), and ends the present process.

On the other hand, in step S112, if the MFP apparatus has determined that the number of retries has not exceeded the setting value, it ends the present process.

Figure 15:
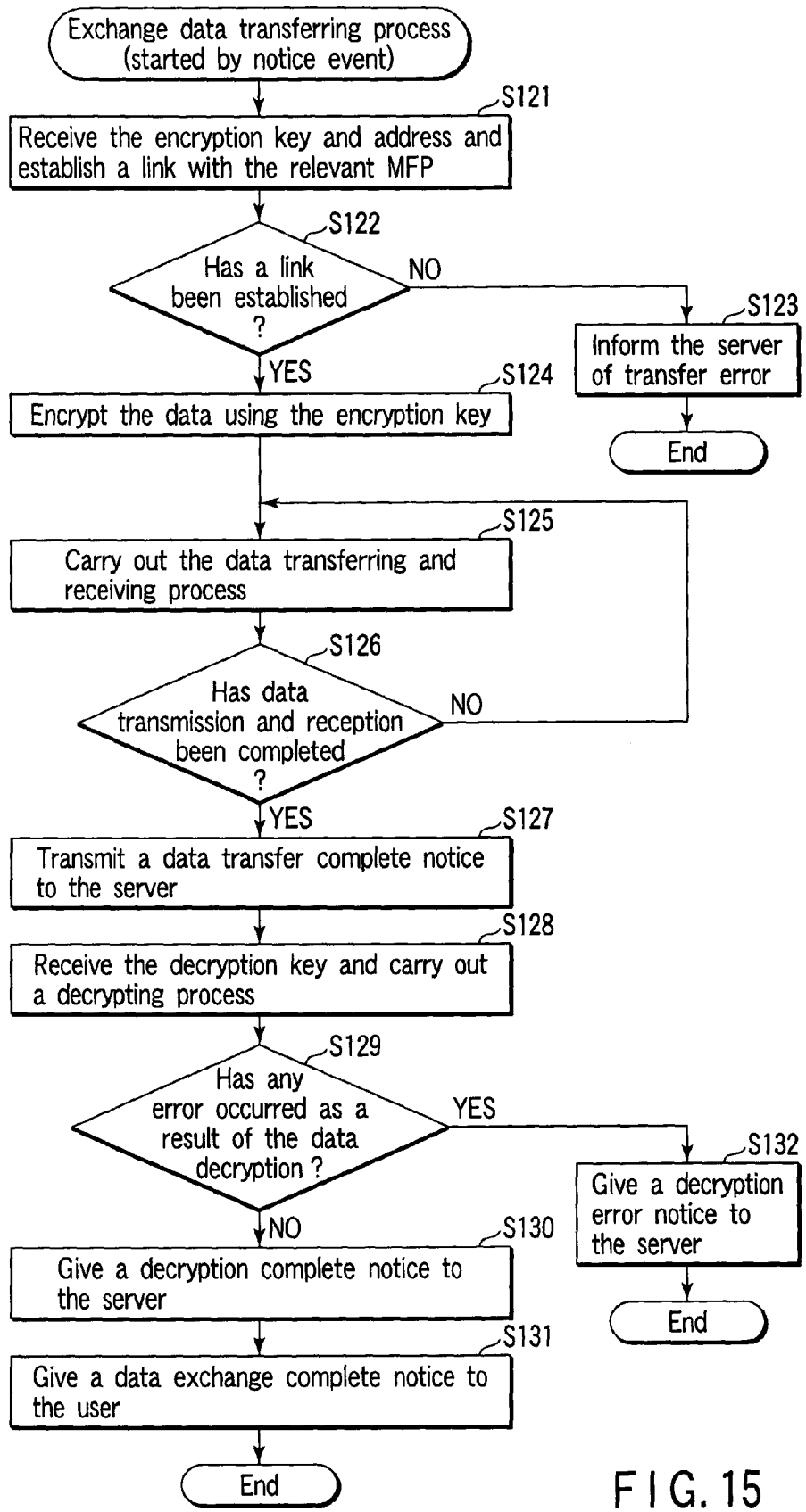
FIG. 15 is a flowchart for the process of transferring data in the MFP apparatus according to the second embodiment of the present invention.

Referring to a flowchart in FIG. 15, an exchange data transferring process in the MFP apparatus of the second embodiment will be explained. The exchange data transferring process is started when a notice event takes place at the MFP apparatus.

When starting to carry out the exchange data transferring process, the MFP apparatus receives the encryption key and address and establishes a link with the MFP apparatus with which the data is to be exchanged (step S121). Then, the MFP apparatus determines whether a link has been established (step S122).

Then, in step S122, if a link has not been established, the MFP apparatus gives a transfer error notice to the server 14 (step S123) and ends the present step.

On the other hand, if both of the MFP apparatuses have established a link, the MFP apparatus encrypts the data using the encryption key (step S124), carries out the data transferring and receiving process (step S125), and repeats the process until the data transmission and reception has been completed (step S126).

Then, after the data transmission and reception has been completed, when the MFP apparatus transmits a data transfer complete notice to the server 14 (step S127) and receives the decryption key, it carries out a decrypting process (step S128). Then, the MFP apparatus determines whether any error has occurred as a result of the data decryption (step S129). If an error has occurred, the MFP apparatus gives a decryption error notice to the server 14 (step S132) and ends the present process.

On the other hand, in step S129, if no error has occurred, the MFP apparatus gives a decryption complete notice to the server 14 (step S130) and a data exchange complete notice to the user (step S131) and ends the present process.

As described above in detail, with the embodiments, providing a system for redistributing the customize data, template data, and the like created by the user makes it possible not only to reduce the cost on the part of the maker that develops data items, but also to enable the user to select the desired data from a great variety of data, easily and quickly.

Furthermore, with the embodiments, authorization by the maker increases the reliability and assures charges, which makes stronger the possibility that useful applications will be found. In addition, the embodiments enable data exchange to be performed easily at hot spots, such as convenience stores, which gives a boost to the distribution of contents.

Moreover, in the embodiments, just setting keywords enables the necessary information to be acquired automatically, which shortens the time required to acquire information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multifunction printing (MFP) apparatus comprising:
   a communication section which communicates with at least another MFP apparatus and a server via a network;
   a storage section which stores data received via the communication section;
   a control panel which inputs operation instructions to the MFP apparatus; and
   a control section,
   the control section controlling the following operations:
   (i) organizing information for specifying customized data regarding a control panel in a form of a data file, and applying registration of the information to the server;
   (ii) receiving a request for the customized data sent from another MFP apparatus based on the information registered in the server and sending the customized data to another MFP apparatus; and
   (iii) sending a request for the customized data to another MFP apparatus based on the information of another MFP apparatus registered in the server, storing in the storage section the customized data received based on the request, and updating display of the control panel with the customized data.

2. The MFP apparatus according to claim 1, wherein the control section further performs control in such a manner that it informs the server that the customized data has been stored.

3. The MFP apparatus according to claim 1, wherein the storage section has a personal folder, and the control section performs control in such a manner that only an individual specified by a specific authentication is permitted to use the personal folder.

4. The MFP apparatus according to claim 3, wherein the specific authentication is made by the control section referring to a user management table based on an identification (ID) in an ID card.

5. The MFP apparatus according to claim 3, wherein the control section, when storing data in the personal folder of the storage section, performs control in such a manner that it stores data together with at least one of a genre with a hierarchic structure related to classification, free words, and a presence or absence of charges.

6. The MFP apparatus according to claim 1, wherein the MFP apparatus receives payment of a specific registration fee in compensation for registration or pays specific charges when storing data transmitted front another MFP apparatus into the storage section.

7. The MFP apparatus according to claim 1, wherein the data file includes at least various types of link information lists and, when the application for the registration is accepted by the server, delivers at least the various types of link information lists to another MFP apparatus via a network.

8. The MFP apparatus according to claim 1, wherein the control section performs control in such a manner that it adds additional information about classification, keywords, and conditions for exchange and distribution to the input operation instructions, and registers the additional information in the server.

9. The MFP apparatus according to claim 1, wherein the control section performs control in such a manner that it receives an encryption key and a decryption key from the server, transfers data encrypted using the encryption key to a specified address, or that it receives encrypted data transferred from another MFP apparatus, stores the encrypted data, and decrypts the encrypted data using the decryption key.

10. A multifunction printing (MFP) system, comprising:
    an MFP apparatus; and
    a server which manages the MFP apparatus,
    wherein the MFP apparatus comprises:
       communication means for communicating with at least another MFP apparatus and a server;
       storage means for storing data received via the communication means;
       a control panel which inputs operation instructions to the MFP apparatus; and
       control means, for controlling the following operations:
       (i) organizing information for specifying customized data regarding a control panel in a form of a data file, and applying registration of the information to the server;
       (ii) receiving a request for the customized data sent from another MFP apparatus based on the information registered in the server and sending the customized data to another MFP apparatus; and
       (iii) sending a request for the customized data to another MFP apparatus based on the information of another MFP apparatus registered in the server, storing in the storage means the customized data received based on the request, and updating display of the control panel with the customized data,
    wherein the server comprises:
       a communication section which communicates with the MFP apparatus via a network;
       a storage section which stores various types of data; and
       a control section which performs control in such a manner that it classifies the customized data at the MFP apparatus, accepts an application for registration of identification information, retrieves data fulfilling conditions for exchange related to conditions or distribution, informs the MFP apparatus of a list of the retrieved data, and starts data transfer using approval of a user of the MFP apparatus as an event.

11. The MFP system according to claim 10, wherein in the server, the control section performs control in such a manner that it authenticates operation about data a registration of which is applied for and registers the data when a result of the authentication has shown that a specific level has been exceeded.

12. The MFP system according to claim 10, wherein in the server, the control section performs control in such a manner that it demands specific charges from the MFP apparatus, when permitting the application for the registration made by the MFP apparatus.

13. The MFP system according to claim 10, wherein in the server, the control section performs control in such a manner that, when another MFP apparatus downloads the customized data held in an MFP apparatus, the control section demands charges for the download from the another MFP apparatus.

14. The MFP system according to claim 10, wherein in the server, the MFP apparatus performs control in such a manner that it transmits an encryption key to an MFP apparatus before starting exchange or distribution.

15. A method for controlling a multifunction printing (MFP) apparatus and a server, the method comprising causing the MFP apparatus to perform the following operations of:
- (i) causing first communication means provided in the MFP apparatus to communicate with at least another MFP apparatus and the server;
- (ii) causing first storage means provided in the MFP apparatus to store data received via the first communication means; and
- (iii) causing first control means provided in the MFP apparatus to control the following operations:
  - (1) organizing information for specifying customized data regarding a control panel provided at the MFP apparatus to input operation instructions to the MFP, in a form of a data file, and applying registration of the information to the server;
  - (2) receiving a request for customized data sent from another MFP apparatus based on the information registered in the server and sending the customized data to another MFP apparatus; and
  - (3) sending a request for the customized data to another MFP apparatus based on the information of another MFP apparatus registered in the server, storing in the first storage means the customized data received based on the request, and updating display of the control panel with the customized data, and the method also comprising causing the server to perform the following operations of:
- (i) causing second communication means provided in the server to communicate with the MFP apparatus via the network;
- (ii) causing second storage section provided in the server to store various types of data; and
- (iii) causing second control means to perform control in such a manner that it classifies the data customized at the MFP apparatus, accepts an application for a registration of identification information, retrieves data fulfilling conditions for exchange related to conditions or distribution, informs the MFP apparatus of a list of the retrieved data fulfilling conditions for exchange related to conditions or distribution, and starts data transfer using approval of a user of the MFP apparatus as an event.

16. The method according to claim 15, wherein in the server, the second control section performs control in such a manner that it authenticates operation about data a registration of which is applied for and registers the data when a result of the authentication has shown that a specific level has been exceeded.

17. The method according to claim 15, wherein in the server, the second control section performs control in such a manner that it demands specific charges from the MFP apparatus, when permitting the application for the registration made by the MFP apparatus.

18. The method according to claim 15, wherein in the server, the second control section performs control in such a manner that, when another MFP apparatus downloads the customized data held in an MFP apparatus, the control section demands charges for the download from the another MFP apparatus.

19. The method according to claim 15, wherein in the server, the MFP apparatus performs control in such a manner that it transmits an encryption key to an MFP apparatus before starting exchange or distribution.

* * * * *